Aug. 24, 1954  M. J. COHEN  2,687,130
MEDICAMENT AND CONTAINER THEREFOR
Filed Jan. 13, 1950
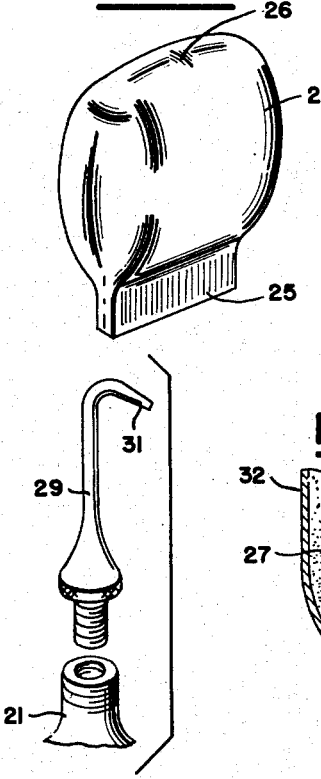
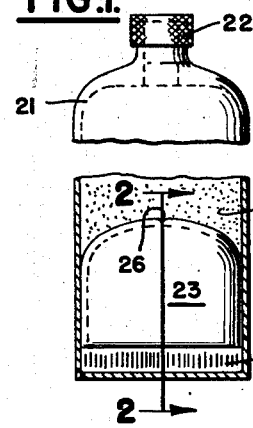
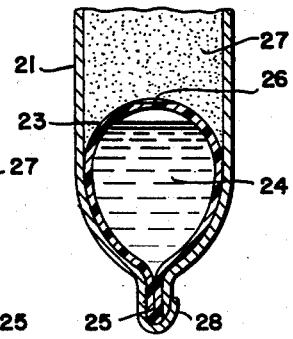
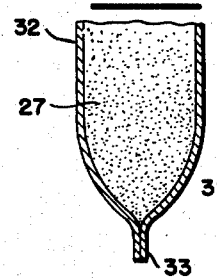
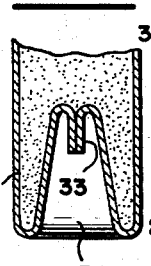
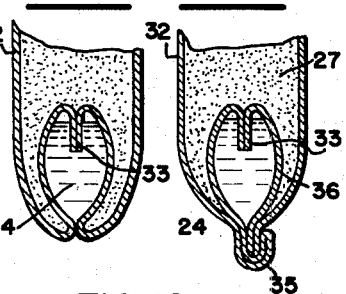
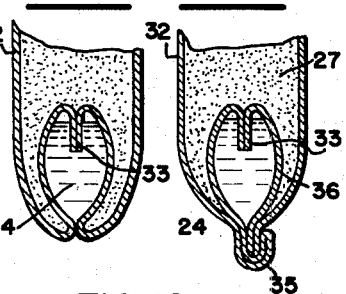
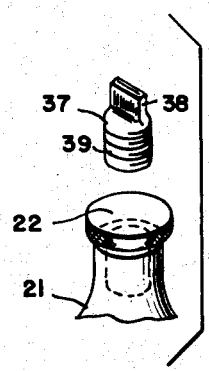
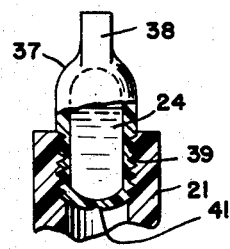
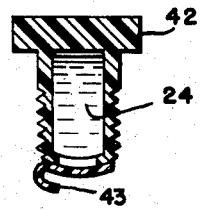
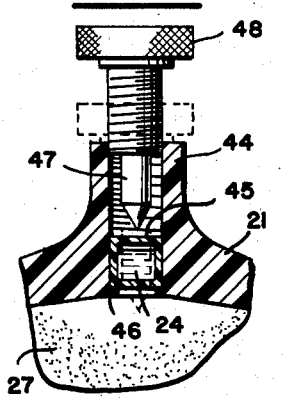
INVENTOR
Milton J. Cohen.

Patented Aug. 24, 1954

2,687,130

UNITED STATES PATENT OFFICE 2,687,130

MEDICAMENT AND CONTAINER THEREFOR

Milton J. Cohen, Washington, D. C.

Application January 13, 1950, Serial No. 138,495

8 Claims. (Cl. 128—272)

The present invention relates to a medicament and a container therefor and more particularly to a dental pain killer compounded of two ingredients which normally hardens in a short time and a special container for keeping the ingredients apart until just prior to use while permitting ready intermixture of the ingredients at the proper time.

At the present time, there are many medicaments on the market purportedly designed to alleviate the pain of a toothache and which are readily obtainable by the general public for home application. Unfortunately, most of these home remedies are ineffective and at best yield only temporary relief if at all.

Dentists have more effective treatments which afford considerable relief but which are not available for home application for the reason that they must be compounded of several ingredients in definite proportions at the time of use as they normally harden in a short time. The hardening is a distinct advantage in that the medicament is generally forced into the cavity of the tooth which aches and shortly relieves the pain, the hardened material acting as a temporary filling to protect the sensitive areas of the cavity until the medicament has had an opportunity to clear up any infection in the tooth.

The present invention contemplates the use of one of the latter type of medicaments and provides a container which maintains the ingredients apart until it is desired to mix them for use at which time, the ingredients can be thoroughly, rapidly and readily intermixed within such container. Specifically, the invention comprises a medicament compounded of a liquid and a powdered ingredient, the liquid being enclosed in a readily frangible capsule which itself is enclosed within a larger flexible tube having also therein the powdered ingredient whereby pressure may be exerted on the larger tube to collapse the inner capsule and the larger tube may then be kneaded to throughly intermix the liquid and the powder to form a paste. An applicator is provided for attachment to the tube thereby to permit pressure on the tube to eject the contents of the tube through the applicator to the cavity within the tooth.

An object of the present invention is the provision of a toothache remedy and container which permits preparation of the remedy immediately before application.

Another object is to provide a container for a toothache remedy which can be cheaply made and is readily manipulated by a member of the public to properly compound and apply the remedy.

A further object of the invention is the provision of a double chambered container in which the inner chamber is provided with means which acts to maintain the inner chamber in its proper position while providing a leak-proof seal for the outer chamber.

Still another object is the provision of a single container which is constructed and arranged to form two separate chambers one within the other, the inner one being leak-proof but easily frangible.

Another object of the invention is to provide a method for constructing and filling a double chambered container formed from a single container without destroying the continuity of the walls thereof thereby to reduce the possibility of leakage.

Yet another object is the provision of a small container or capsule which acts as a cap for a larger container, the former being readily frangible to permit intermixture of the contents of the containers.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 shows a view in elevation and partly in section of a preferred embodiment of the invention.

Fig. 2 shows a section of the container of this invention taken on the line 2—2 of Fig. 1 looking in the direction of the arrows.

Fig. 3 is a view in perspective and greatly enlarged of a capsule employed in the container of Fig. 1.

Fig. 4 is an exploded view of an applicator adapted for use with any of the containers of the invention.

Figs. 5 to 8, inclusive, illustrate four successive stages of the construction and filling of another form of the invention.

Fig. 9 illustrates a third form of the invention in which the capsule is not made integral with the tube.

Fig. 10 shows an enlarged view partly in section of the capsule of Fig. 9 as applied to the tube.

Fig. 11 illustrates in section a fourth form of the invention in which the capsule may form a cap for a larger tube.

Fig. 12 shows in section still another form of the invention.

Referring now to the drawings, there is shown in Fig. 1 a tube 21 made of a soft metal alloy containing lead, zinc, aluminium or the like so as to be readily collapsible in the conventional manner of the well-known tooth paste tube. If desired the tube 21 may be made of any one of the flexible films known in the art and made of rubber or other elastomers or the like.

The tube 21 is provided with a conventional knurled cap 22 for its discharge end which is adapted to be screwed either internally or externally of the mouth of the tube to seal the same.

The tube 21, as disclosed hereinabove, is intended to receive the ingredients of a toothache remedy comprised of a powder and a liquid which cannot be intermixed until just prior to use because of rapid hardening after compounding. Specifically, the powder to be employed is zinc oxide and the preferred liquid is eugenol, a well-known ingredient fully described in the U. S. Pharmacopeia.

To provide a container for the liquid eugenol, a capsule 23 is fashioned from an open ended bag made of any rubber-like film, which is then filled with eugenol 24 and sealed to form an elongated flat tab 25. The capsule 23 is also provided with a small nick 26 at the end opposite the tab 25 in order to slightly weaken the capsule at this point for a reason to be made clear hereinafter.

As shown in Fig. 1, the tube 21 is partly filled through its bottom with zinc oxide powder 27 and the capsule 23 is next placed in the tube with the tab 25 adjacent the end thereof. The tube end is then crimped upon the tab 25 to seal the end of the tube and, if desired, the tube end is folded over as shown at 28 in Fig. 2 to further seal the tube. It will be noted that the tab 25 performs a double function in that it maintains the capsule 23 at the bottom of the tube 21 by reason of its being crimped into the bottom end of the tube and it acts as a sealing gasket for the end of the tube 21 by reason of its ability to be flexibly distorted and to conform to the crimping of the tube end.

The manner in which the remedy is used will now be described. It is clear that as long as the capsule 23 remains intact, the remedy may be stored indefinitely as there is no possibility of intermixture of the eugenol and the zinc oxide. When the remedy is to be used, the lower end of tube 21 is squeezed in the hand until the capsule 23 fractures at the nick 26 causing the eugenol to squirt from the capsule into the zinc oxide in the tube 21. The tube is next kneaded with the hands for a period sufficient to cause thorough intermixing of the eugenol and the zinc oxide to form a thick creamy paste. During such kneading, the lower end of the tube 21 shows no tendency to leak by reason of the liquid tight gasket formed by the tab 25 nor can the capsule 23 work its way up to the mouth of the tube and thus tend to block same.

When the eugenol and the zinc oxide are thoroughly mixed, the cap 22 is unscrewed from the tube and the applicator 29 (Fig. 4) is screwed into the mouth of tube 21. The pointed end 31 of the applicator may now be inserted in the tooth cavity and pressure on tube 21 will eject therefrom and into the tooth cavity, the desired quantity of the remedy which not only soothes the pain of the toothache but also hardens in the presence of saliva to form a temporary filling and protect the cavity from further irritation.

Referring now to Figs. 5 to 8, inclusive, there is shown therein another method for constructing the tube and capsule to form separate chambers for the zinc oxide and the eugenol. In Fig. 5, the tube 32, which is similar to the tube 21 of Fig. 1 but somewhat longer, is partly filled with zinc oxide 27 and crimped at the bottom as shown at 33. As shown in Fig. 6, the lower end of the tube is next forced inwardly to form the cavity 34. This cavity is filled with eugenol 24 and then closed as shown in Fig. 7 by forcing the extreme lips of cavity 34 together. These lips are then crimped and folded over (see 35, Fig. 8) to form a tightly sealed capsule 36 containing eugenol and a tightly sealed tube 32 containing zinc oxide.

The use of this embodiment is similar to that of Fig. 1. It is apparent that because of the single crimp 33 in the capsule 36 and its reentrant arrangement within the capsule, any pressure upon the capulse will cause the crimp 33 to open and admit the contents of the capsule to the tube 32 where they may be kneaded in the manner discussed hereinabove to produce the desired remedy.

Figs. 9 and 10 disclose a third embodiment of the invention in which the tube 21, filled with zinc oxide and sealed by cap 22, is entirely separate from capsule 37 containing eugenol 24. The capsule 37 is made of a soft flexible material which, after being filled, is crimped at 38 to seal it. The capsule is provided with screw threads 39 and a nick 41 at the end opposite crimp 38.

In the modification of Figs. 9 and 10, the cap 22 is removed from tube 21 and the capsule 37 screwed into its mouth. When the capsule is squeezed, it bursts at nick 41 and the eugenol is discharged into the zinc oxide and both are mixed by kneading the tube 21. If desired, the cap 22 may be omitted and the capsule 37 may serve as the cap for the tube 21, the crimp 38 serving as a convenient handle for screwing the capsule to the tube.

Fig. 11 shows an arrangement in which the capsule 42 is made in the form of a rigid cap for sealing a tube of zinc oxide. When it is desired to mix the eugenol 24 with the zinc oxide, it is only necessary to remove the pull tab 43 from one end of the capsule and then screw the capsule back onto the tube to permit intermixture of the eugenol and the zinc oxide.

In Fig. 12, the tube 21 is provided with an elongated mouth 44 adapted to receive a capsule 45 made of a soft plastic material and filled with eugenol 24. The capsule rests on shoulders 46 and is adapted to be penetrated by a pin 47 carried by the cap 48 which is screwed further into the mouth 44 when it is desired to mix the contents of the capsule and the tube.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. A container comprising a flexible tube having a mouth and a filling opening adapted to receive a powder, a frangible capsule adapted to receive a liquid mounted within the tube at said filling opening, and means for closing said filling opening and simultaneously rendering said capsule immovable within the tube.

2. A container comprising a flexible metallic tube having a mouth and a filling opening, a frangible elastic capsule within said tube having a tab clamped in said filling opening to form a gasket for said opening and simultaneously restrict movement of said capsule within said tube.

3. A container comprising a flexible metallic tube having a mouth end and a crimped filling opening end, said filling opening end being reentrant within the tube to form an open-ended pocket, and a crimp on the end of said pocket to seal same.

4. A package comprising a compressible tube containing solid material and an imperforate frangible capsule in the tube, said capsule containing liquid capable of reacting with the solid material, wherein the tube has an outlet at one end, and the capsule is fixed in place adjacent the opposite end of the tube.

5. A container for incompatible materials comprising a flexible outer member having a filling opening and a capsule within said member, said capsule being more readily rupturable than the outer member and being secured in said filling opening so as to close the same and also to restrict movement of the capsule in said outer member.

6. A container as in claim 5, wherein the capsule is flexible and has a portion clamped in said filling opening so as to close the same and to restrict movement of the capsule in said outer member.

7. A container for preserving incompatible materials comprising a flexible tube having an outlet and a filling opening, a sealed rupturable capsule within the tube and secured to the same at the filling opening so as to seal the tube and also to restrict movement of the capsule within the tube.

8. A device as in claim 7, wherein the tube is flattened at its filling opening and the capsule has a tab clamped in the filling opening to seal the tube and to restrict movement of the capsule in the tube.

References Cited in the file of this patent

UNITED STATES PATENTS

| Number | Name | Date |
| --- | --- | --- |
| 1,332,985 | Jarrett | Mar. 9, 1920 |
| 1,960,858 | Strauch | May 29, 1934 |
| 2,052,158 | Zink | Aug. 25, 1936 |
| 2,404,316 | Sack | July 16, 1946 |
| 2,562,402 | Winsten | July 31, 1951 |

FOREIGN PATENTS

| Number | Country | Date |
| --- | --- | --- |
| 570,449 | Great Britain | July 6, 1945 |